Figure 1:
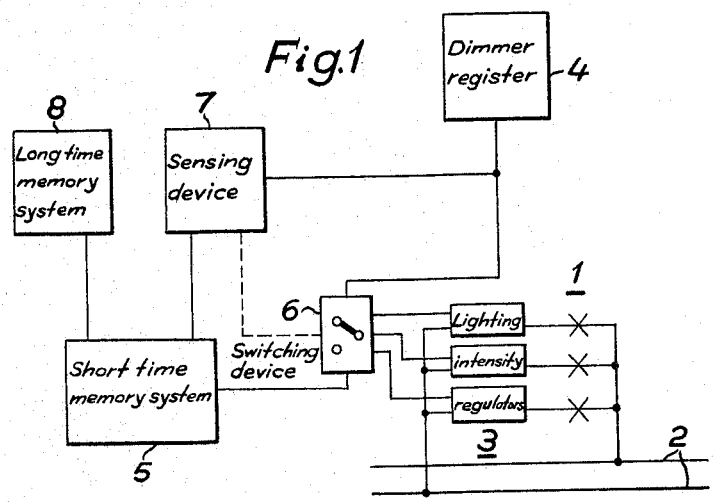

United States Patent Office 3,265,932
Patented August 9, 1966

3,265,932
AUTOMATIC CONTROL EQUIPMENT FOR A STAGE LIGHTING SYSTEM
Bror Pettersson, Malmo, Sweden, Tomas Berg, Oslo, Norway, Erik Djurberg, Stockholm, and Sven Erik Johansson, Johanneshov, Sweden, assignors to Allmanna Svenska Elektriska Aktiebolaget, Vasteras, Sweden, a corporation of Sweden
Filed Mar. 21, 1963, Ser. No. 267,016
8 Claims. (Cl. 315—292)

The present invention relates to an automatically controlled stage lighting system comprising a number of individually controllable lamp circuits having at least one electrically remote controlled regulator, a so-called intensity regulator for each lamp circuit.

At a theatre performance it must be possible to vary the stage lighting according to a completely arbitrary programme dependent only upon the artistic demands. Modern stage lighting systems these days therefore always comprise a great number of controllable lamp circuits controlled usually by individual intensity regulators which are electrically remote controlled from some suitable position in relation to the stage. With manual control of such a system the limitation in variation possibilities is not set by the technical equipment but by how much the person or persons attending the equipment have time for during the performance taking place. It is thus desirable to automate such an equipment so that it is possible to set the different lighting moments simply and rapidly during rehearsal and reproduce an intensity regulation programme once determined at several subsequent performances and to store such a determined programme outside the system for a long time. Thus, for example, an automatic programme control system has been proposed with which a punch card system is set from code-converters in the stage setting, one for each control circuit. Their output circuits are successively connected to the punch card system which during the performance sets converting members, suitably in the form of matrixes. Such a system has the disadvantage that the number of code converters necessary is equal to the number of control circuits, and thus considerable. Further conversion means, matrixes, are required when reproducing the programme.

By means of the present invention these disadvantages are avoided. It relates to an automatically controlled programme regulating system for a number of lamp circuits together with a manually operated dimmer register system with a number of control circuits arranged to give control signals to intensity regulators for adjustment to the desired light intensity, and with a long time memory, preferably a punch card system, for recording and reproducing the desired light intensities and having a capacity at least corresponding to the product of the number of intensity regulators and light intensity steps. The system according to the invention is characterised by a short time memory, preferably a relay register, having a number of memory systems corresponding to the number of intensity regulators, and a common sensing means for a number of intensity regulators, to consecutively sense the control signals and transmit them to the short time memory in a suitable form, whereby the short time memory is arranged to collect signals transmitted from the sensing means and relay them to the long time memory, while the short time memory at reproduction is arranged to convert and store signals left by the long time memory and transmit them to the light intensity regulators. In this way the advantage is obtained that for a number of light intensity regulators only one code converter in the form of a sensing means is required, which is successively connected to the control circuits and whose output information is collected in a short time memory. Since this short time memory is also suitable for reproduction, it may be used both during recording and reproducing, thus making a considerable saving in material.

As long time memory in this case punch cards are particularly suitable because of their convenient capacity, but other types of long time memories, for example magnetic memories or punched strips could be used. With the help of such systems it is possible during rehearsals to transmit in a very short time, less than one minute, settings in the lighting system made with the help of the manual system, to the long time memory, for example, to a card inserted in the punch apparatus of a punch card system, whereby recording can be carried out without disturbing the rehearsal. With a long time memory in the form of punch cards, each light moment will have a corresponding punch card and with the help of a series of punch cards it will be possible to reproduce a predetermined light intensity programme when and as often as desired.

According to the invention the short time memory, for example in the form of a relay register, is suitably formed so that at reproduction the information from a punch card inserted in the reading apparatus in the punch card system is transmitted to the short time memory and stored in this. This means that the punch cards need only be in the card track of the punch card system during reading or punching. This is particularly valuable if according to the invention the equipment comprises two or more short time memories where the separate short time memories are arranged to alternately record consecutive light moments.

According to the invention, for each intensity regulator the equipment may suitably comprise a connection or switching over means for connecting the intensity regulators either to corresponding memory systems in the short time memory or to the control circuit in the manual system. In this way it will be possible to connect each intensity regulator separately to the short time memory or the manual system and according to the invention a sensing device is suitably provided with a comparison means for comparison of the control signals set on the manual system with the recording of the short time memory in such a way that when a memory system at recording is set in agreement with the control signal set in the corresponding intensity regulator, the said intensity regulator is switched over from the manual system to the short time memory.

Further, according to the invention, at reproduction those intensity regulators having a light intensity of zero, could suitably be connected to the manual system so that its lamp circuits are available for manual operation and the producer and lighting technician are able to interfere with the lighting system through the free lamp circuits whenever they wish.

This possibility of manual interference in a light intensity programme may be increased according to the invention in such a way that an intensity regulator controlled by the short time memory may be taken over for manual control from the manual system with the aid of a comparison member for comparing the control signals stored in the short time memory with a setting made in corresponding control circuits in the manual system and at analogy the intensity regulator is automatically switched over from the short time memory to the manual system.

By means of the last mentioned arrangement it is possible to arbitrarily interfere in a previously arranged light intensity programme, which is of great importance since the main objection of theatre people to automatic operation of stage lighting systems has been that the automatic operation denied the producer and lighting technician the possibility of interfering when necessary. According to the invention, said comparison member is suitably formed of the mentioned comparison member in the sensing device, whereby the number of necessary components is further decreased.

In order to improve the rapidity and regulation possibilities with the equipment, according to the invention one or more of the components, manual system, short time memory, long time memory and sensing device may suitably be doubled, possibly several times. Although in principle it is possible to operate the system according to the invention with only one of each component, it is desirable that there are at least two short time memories. It will thus be possible during reproduction to allow the lighting system at each moment to be controlled by one recording in one of the short time memories, while the next moment in the light intensity programme from the long time memory is fed into the second short time memory. In this case, the equipment must also comprise a connection means for switching over from one relay record to the other, forming a main-dimmer for the two short time memory systems. Such a main-dimmer may for example be produced as illustrated in the Swedish Patent No. 126,792. In the same way it is often desirable to have two manually operated systems and it may also be desirable to have the reading and punching apparatus in the punch card system duplicated.

Each duplication requires a corresponding main-dimmer suitably arranged in a common main desk in a control room, where the manual register and punch card system are situated. If desired, the main desk member may also be duplicated so that the producer or stage manager is able to control the system.

Since the above mentioned switch-over must sometimes be carried out extremely rapidly and sometimes last rather a long time, for example half an hour, it may be desirable according to the invention to control the mentioned main-dimmers according to a signal recorded in the long time memory.

As mentioned above the sensing device may according to the invention comprise some form of comparison member which senses the control signal transmitted to a light intensity regulator, for example in the form of a control voltage or a control current and compare it with the recording of the short time memory. The sensing device may hereby comprise, for example only one control circuit, whereby transmission to the short time register is done for one light intensity regulator at a time. With such an arrangement, the transmission during rehearsal of a certain light moment from light intensity regulator to short time memory and further to the long time memory, may be carried out in less than one minute in systems having 200–300 control circuits. This time can, if desired, be shortened by suitable duplication of the sensing device by having two or more sensing devices.

At recording it is suitable to make the sensing device sense the control signal occurring in a light intensity regulator for transmission to the short time memory. In this way it is unimportant if the setting of a lamp circuit has been made from one control circuit in one manual system or by simultaneous control in two series-connected control circuits from two different manual systems or possibly from a special voltage divider, a so-called dimmer which is common for a number of control circuits in one or both manual systems. Thus, the lighting technician may with the help of the manual system or systems and possible dimmers arbitrarily adjust the different lamp circuits separately or group-wise since it is then the control signals in the light intensity regulator which will be transmitted to the short time memory and from there to the long time memory.

Since in a stage lighting system, different colours are used as well as varying light intensities, it is suitable to arrange according to the invention separate light regulators partly to control the light intensity and partly to control the light colour in at least some of the lamp circuits. While with light intensity regulation it is desirable to have a large number of steps, for example 20 steps from zero to full light intensity in order to obtain as even a regulation as possible, with colour choice it is usually sufficient with for instance five different stages. This, however, is in itself unimportant for the principle of the invention.

Figure 3:
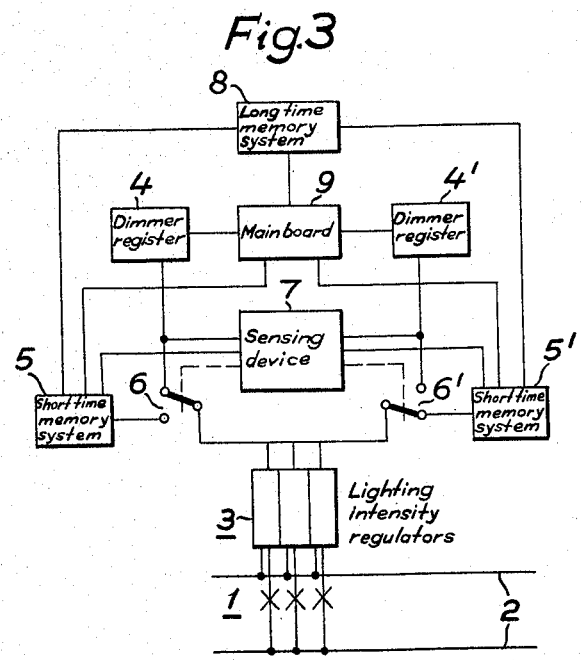
Figure 2:
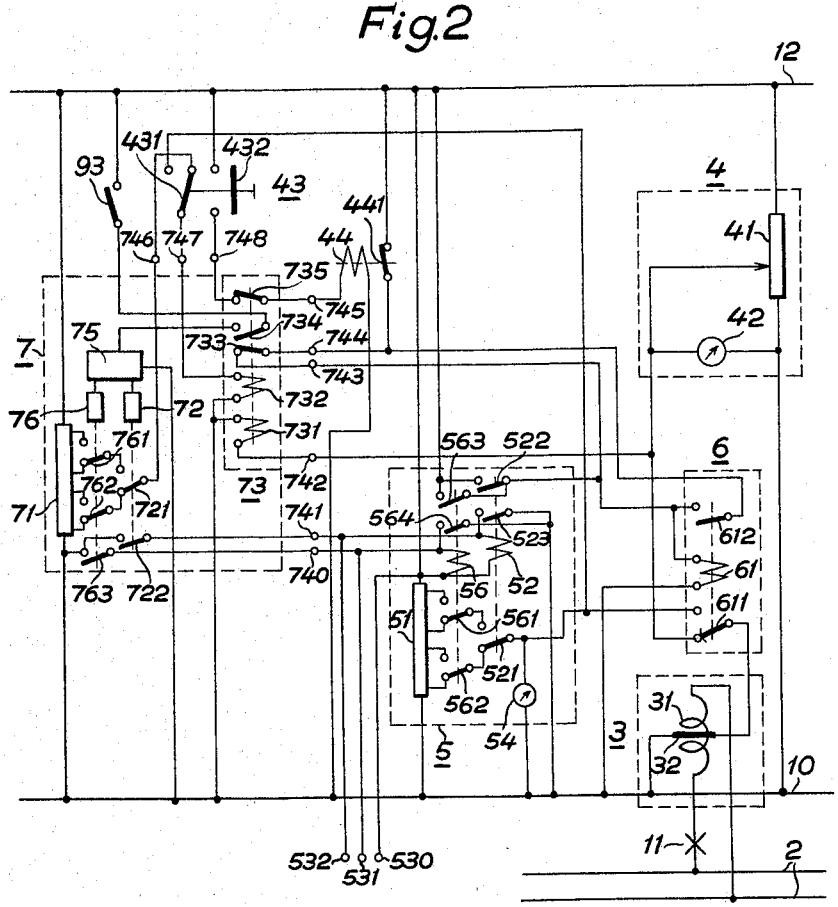

The invention will be further described with reference to the accompanying schematical drawing, where FIGURE 1 shows a block scheme for an equipment according to the invention having one of each of the different components, while FIGURE 2 shows an example of how a light intensity regulator is connected to corresponding circuits within the other components. FIGURE 3 shows a scheme for a system provided with double manually operated dimmer register system and double relay register, whereby the system also includes a main desk for switching over between duplicate components.

FIGURE 1 shows a number of lamp circuits 1 fed from a network 2 and controlled from individual light intensity regulators 3. When arranging a programme the various light intensity regulators are connected to the corresponding control circuits in the manually operated system 4 by means of a connecting member 6, for example provided with double-throw contacts. When a moment in the light intensity programme has been set with the help of the different control circuits in the manual system, the sensing device 7 is connected partly to the different light intensity regulators and partly to the corresponding memory circuits in a short time memory system 5, preferably a relay register, for example with the help of a uniselector system, whereby appropriate control signals in the light intensity regulator are transmitted to the short time memory system. As mentioned earlier this sensing device can serve all the light intensity regulators or two or more devices may be arranged to sense each part of the system. Further, the sensing device is arranged to influence the connecting member 6 in such a way that when a control signal through the sensing device has been transmitted to the short time memory, corresponding light intensity regulators are switched over to the appropriate memory circuits. When all control signals have been transmitted to the short time memory, this is connected to a long time memory 8, for example a punch card system, whereby the recording of the whole lighting system is inserted on a punch card. Each determined light moment will then be represented by a punch card and the different punch cards are provided with a number to indicate their position in the sequence. It will thus be possible, when desired, to take out one punch card and replace it with a new one corresponding to a new setting from the manual system, or possibly to divide an appropriate light moment into several part-moments, so that the original punch card will be replaced by several punch cards.

The operation is illustrated in FIGURE 2 which shows a lamp group 11 fed from the network 2 via a light intensity regulator 3, here in the form of a transductor 31 provided with a control winding 32. Instead of a transductor the light intensity regulator may of course be replaced by other control means, for example adjustable transformers, thyratrons or relay combinations. The control winding 32 is fed from two direct current conductors 10, 12, via the double-throw contact 611 in the connection means 6 which has the form of a relay with a coil 61. By switching this double-throw contact, the control winding 32 can be fed via the potentiometer 41 in the manual system 4 or via the potentiometer 51 in a memory circuit in the short time memory 5 which here has the form of a relay register 52, 56.

This switching over occurs at recording with the help of the sensing device 7 which is connected to the different circuits by means of terminals 740–748. The figure shows a common sensing device for all the light intensity regulators, whereby connection of the device to the different circuits via said terminals takes place consecutively, for example with the help of a uniselector. All relays are shown in rest position.

At recording, the different lamp circuits are set with the help of the manual system, i.e. the potentiometer 41 is adjusted until the lamp group 11 has the desired intensity. When this has been done for all the lamp circuits, an order is given to the sensing device to sense the control voltages arising over the control windings 32.

In the case shown, this control voltage, via the terminal 742, will influence the relay coil 731 in the relay 73. This relay has a counteracting second coil 732 which, via the terminal 747 and the double-throw contact 431 is connected to the potentiometer 71 via one or some of the double-throw contacts 721, 761 and 762. If the voltages over the two coils are unequal the relay 73 will close so that the contact 733 will be opened while the contact 734 is closed. When the sensing device is connected to the shown circuit for recording, another contact 93 is closed and a relay combination 72, 76 will receive voltage via a control device 75 when the contact 734 is closed. In the shown case the potentiometer 71 is provided with four outputs which via the alternating contacts 721, 761 and 762 in two relays 72 and 76 are connected to the output terminal 746 of the potentiometer. The two relays 72 and 76 are controlled from a common control device 75 of known type, for example, a motor- or relay-driven contact system, or possibly an electronic system, which connects one or the other or both the relays or neither of them, as long as the voltage derived from the potentiometer 71 is less than or exceeds the voltage fed in at the terminal 742. In this way it is possible to connect the output terminal 746 to any of the four outputs on the potentiometer.

Each of the relays 72 and 76 is provided with an extra contact 722 and 763 respectively for controlling corresponding relays 52 and 56 in the short time memory circuit 5. This has the form of a potentiometer 51 corresponding to the potentiometers 41 and 71 with four outputs which, via the contacts 521, 561 and 562 may be connected to the double-throw contact 611. By means of the contacts 722 and 763, therefore, the relays 52 and 56 will always be set in the same way as the relays 72 and 76 respectively so that the voltage over the potentiometer 51 will follow the voltage over the potentiometer 71.

By providing more relays and double-throw contacts in the sensing device and short time memory, the potentiometers 51 and 71 may be given more outputs. With 1, 2, 3, 4, etc. relays, 2, 4, 8, 16, etc. outputs are obtained, so that a desired accuracy may be obtained in the step-wise adjustment of the potentiometers 71 and 51, following the continuous adjustment of the potentiometer 41. The relays in the sensing device and the short time memory will thus form a binary system and the adjustment of this will correspond to a binary number system 00–01–10–11.

Instead of the shown binary relay system for adjusting the potentiometers 71 and 51, many other forms of potentiometer control may of course be used. However, the binary system is particularly suitable in connection with punch card systems. In FIGURE 2 this is illustrated by the terminals 530–32. Between 530 and 531–32, respectively, the voltages over the relays 56 and 52, respectively, are read and each square on the punch card should thus have a figure for each relay in the short time memory system and a figure punched out on a punch card at recording will make the reading contact in the punch card system at reproduction connect the corresponding relay in the short time memory.

When the control device 75 has found the correct combination of the relays 72 and 76, i.e. when the voltage over the potentiometer 71 and thus over the potentiometer 51 is equal to the voltage over the potentiometer 41 the influences of the coils 731 and 732 in the relay 73 cancel each other, so that this relay drops and closes the contact 733. Thus the coil 61 becomes voltage carrying and this relay closes. The double-throw contact 611 which is a cut-free double-throw contact switches the control winding 32 in the transductor 31 over from the potentiometer 41 to the potentiometer 51, now set at the same value. When the sensing device continues to the next regulator, the relay 6 will be kept connected by means of the contact 612, while the relays 52 and 56 are kept in place by the contacts 523 and 564 respectively. When the control signals of the light intensity regulators have in this way been transmitted to the short time memory, the setting of this can be transmitted to the punch card system, for example as shown, by the voltages being transmitted via the terminals 530–532.

With reproduction the process is reversed, but here the sensing device does not need to be used. Here the alternating contact 611 may simply be blocked in its upper position so that the manual system does not come into use. The orders from the punch card system are fed in via the terminals 530–32, whereby the relays 52 and 56 adjust the potentiometer 51 and the desired light intensity is obtained.

Often, however, only a limited number of lamp circuits is adjusted for automatic operation during recording so that it may be desirable to have the other circuits available for manual control. For this purpose, parallel-connected impulse contacts 522 and 563 have been inserted in the relays 52 and 56.

For those lamp circuits which have not been preadjusted during recording, the impulse contacts thus do not influence the coil 61 so that the double-throw contact 611 will remain in the shown position and respective lamp circuits will be connected to the manual system. For those lamp circuits, on the other hand, which have been preadjusted during recording the impulse contacts 522 and/or 563 will close so that the relay coil 61 receives voltage. The double-throw contact 611 connects the control winding 32 to the potentiometer 51 via the contacts 521, 561, 562. At the same time the retaining contact 612 will close. The impulse contacts are so formed that they are only closed so long that the relay 6 has time to close. In this way the alternative connection of the control winding 32 to the short time memory or the manual system respectively is dependent upon which lamp circuits have been preset during recording.

If during reproduction it is desired to interfere in any of the lamp circuits set during recording and take over control manually, this may be done manually. The volt meter 54 in this case shows the voltage arising over the control winding 32 and if the potentiometer 41 is set so that the volt meter 42 shows the same voltage as the volt meter 54, the two-way contact 611 may be manually switched over from its upper to its lower position without disturbance in the lighting in the form of flickering. This switching over may, however, also be done automatically as shown in FIGURE 2 with the help of the contact 43.

This contact is shown being controlled by a simple press button, but is actually part of a relay, not shown, which comprises partly the shown contacts, partly a contact means which, for example, via a uniselector, connects the sensing device 7 to the circuit where switching over from the short time memory to the manual system is desired. Said relay is suitably controlled from a pressure contact arranged for appropriate control circuits in the manual system. The sensing device is thus connected to a desired control circuit in the manual system by pressing a button. The relay 6 has closed due to an impulse from one of the impulse contacts 522, 563, and is held by the retaining contact 612. When the contact 43 closes, the two-way contact 431 switches over from the right contact to the left contact. As before, the relay coil 731 will be influenced by the voltage over the potentiometer 41 while the relay coil 732 will be influenced by the voltage over the potentiometer 51. If it is assumed that these two potentiometers are adjusted equally, the relay 73 will pick up and the contacts 733 and 735 will thus break while 734 will close. The last mentioned contact, however, has no significance in this case since the contact 93 is arranged to close only during recording. After this, the potentiometer 41 is set manually with the help of the volt meters until its adjustment is in agreement with that on the potentiometer 51. When both these adjustments are equal, the relay 73 drops and the contact 735 closes. In series with the contact 735 a relay coil 44 is arranged and a second contact 432 in the contact group 43. The last mentioned contact is so arranged that it first closes when the alternating contact 431 has switched over and the relay 73 has thus closed and broken the contact 735. When the relay 73 drops and the contact 735 closes, the relay coil 44 receives voltage and opens the contact 441 so that the retaining circuiting for the relay 6 is broken. In this way correct adjustment of the potentiometer 41 is obtained and the relay 73 drops and therewith the relay 6, so that the lamp group is automatically switched over from the short time memory to the manual system when the adjustment of the latter is equal to that of the former. Switching over from the short time memory to the manual system thus takes place quite simply by influencing the contact group 43 and under the direction of the volt meters 42 and 54 moving the handle for appropriate circuits in the manual system in such a direction that it passes the adjustment corresponding to the short time memory adjustment.

In FIGURE 3 a system according to the invention has been shown where the manual system and short time memory have been duplicated. The designations are otherwise the same as in FIGURE 1 with only the difference that duplication of the manual system 4, 4' and short time memory 5,5' has been introduced. At the same time the switching over member 6 has had to be duplicated with a corresponding 6'. Besides these, switching over devices for switching over between the two manual systems and the two short time memories have been added, for example, devices as described in the Swedish Patent No. 126,792.

As mentioned earlier, this switching over may be suitably carried out automatically, for example with the aid of some form of stop watch which in turn is suitably controlled by a code in the punch card.

Said switching over devices are suitably collected in a main desk 9 in a control room in which the other operating means such as means for starting recording, etc. are also arranged.

As mentioned earlier the means in the main desk may also be duplicated so that control of the whole system may be carried out not only from the light control room but also from some other place in the theatre, for example, from where the stage manager is.

While duplication of the short time memory is less important at recording, it is of considerable importance during reproduction since it allows the lamp groups to be controlled from one of the short time memories while the other is being set by the punch card system for the next light moment. In this way a completely continuous transition between light moments is effected. The switching over means 6 and 6' are suitably formed so that arbitrary connection of the light intensity regulators 3 to the short time memories 5 and 5' and the manual systems 4 and 4' may be effected.

We claim:
1. Automatically controlled stage lighting system comprising a number of individually controllable lamp groups, each having its own control circuit, each of said control circuits having at least one lighting intensity regulator, said regulators being remote controlled; said lighting system comprising a manually operated dimmer register, a long time memory system, preferably a punch card system, a short time memory system preferably a relay register and a sensing device; said manually operated dimmer register comprising a number of control circuits, so-called dimmers, said dimmers being arranged to deliver control signals to said lighting intensity regulators corresponding to the desired setting of said lamp groups, said long time memory system being arranged to record and to reproduce said control signals corresponding to said desired settings and having a capacity at least corresponding to the product of the number of lighting intensity regulators and a number of setting steps; said short time memory system having a number of memory circuits corresponding to the number of said lighting intensity regulators; said sensing device being common to a number of said lighting intensity regulators and being arranged for consecutive sensing of the control signal for the corresponding lighting intensity regulators and for transmitting these signals to the short time memory system; said short time memory system being arranged to record said control signals transmitted from the sensing device and to transmit them to the long time memory system, said long time memory system being arranged during reproduction to transmit to the short time memory system control signals recorded in the long time memory system; said short time memory system being arranged to record signals from the long time memory system and to transmit them to said lighting intensity regulators.

2. Automatically controlled stage lighting system as claimed in claim 1, said sensing device comprising a comparison device; said comparison device being arranged to compare the set control signal of each of said lighting intensity regulators with the setting of the memory circuits of said short time memory system; a switching device arranged to switch over said lighting intensity regulator from the manually operated dimmer register to said short time memory system; said switching device operated from said comparison device during recording and arranged to consecutively switch over the lighting intensity regulators when the setting of the short time memory system corresponds to the control signal in the lighting intensity regulators.

3. Automatically controlled stage lighting system as claimed in claim 1, each of said lighting intensity regulators, during reproduction being connected to said short time memory system; during reproduction each of said lighting intensity regulators being arranged to be separately switched over to said manually controlled dimmer register; a comparison device arranged to compare the control signal from the short time memory system with a control signal from said manually operated dimmer register; a switching device operated from said comparison device and arranged to switch over an actual lighting intensity regulator from its memory circuit in the short time memory system to a dimmer of the manually controlled dimmer register when said two control signals correspond to each other.

4. Automatically controlled stage lighting system as claimed in claim 1; a comparison device arranged to compare a control signal from said manually operated dimmer register with a corresponding control signal from said short time memory system; a switching device arranged to switch over each of said lighting intensity regulators between said dimmer register and said memory system; said switching device operated from said comparison device when said two control signals are equal to each other; said comparison device and said switching device being able to operate both during recording and during reproduction.

5. Automatically controlled stage lighting system as claimed in claim 1; during reproduction those of said lighting intensity regulators having the control signal zero from the long time memory system and thus also from the short time memory sytsem being switched over to said manually operated dimmer register.

6. Automatically controlled stage lighting system as claimed in claim 1, said system comprising at least two short time memory systems; said short time memory systems being arranged in connection with a common long time memory system; said short time memory systems being arranged for alternately recording consecutive light moments; during rehearsal said recording being transmitted from said lighting intensity regulators to one of said short time memory systems and further to said long time memory system; during reproduction said recording being transmitted the opposite way.

7. Automatically controlled stage lighting system as claimed in claim 1; some of said lamp groups being provided with colour varying means; some of said lighting intensity regulators being arranged to control said colour varying means.

8. Automatically controlled stage lighting system as claimed in claim 1; said short time memory system comprising a number of potentiometers and a number of relays; said relays being arranged in binary operating groups, each corresponding to one of said potentiometers; said relay groups connected to the corresponding potentiometers via terminals on said potentiometers.

References Cited by the Examiner

UNITED STATES PATENTS 3,004,193  10/1961  Bentahm et al. _____ 315—295
3,221,214  11/1965  Wolff et al. _____ 315—292

JOHN W. HUCKERT, *Primary Examiner.*

L. ZALMAN, *Assistant Examiner.*